United States Patent
Chi

(10) Patent No.: US 9,033,237 B1
(45) Date of Patent: May 19, 2015

(54) DECODING DPM INDICIA WITH POLARIZED ILLUMINATION

(71) Applicant: Symbol Technologies, Inc., Schaumburg, IL (US)

(72) Inventor: Wanli Chi, Stony Brook, NY (US)

(73) Assignee: Symbol Technologies, Inc., Holtsville, NY (US)

(*) Notice: Subject to any disclaimer, the term of this patent is extended or adjusted under 35 U.S.C. 154(b) by 0 days.

(21) Appl. No.: 14/064,115

(22) Filed: Oct. 26, 2013

(51) Int. Cl.
*G06K 7/10* (2006.01)

(52) U.S. Cl.
CPC ........ *G06K 7/10831* (2013.01); *G06K 7/10732* (2013.01)

(58) Field of Classification Search
USPC .................. 235/462.01–462.49, 454
See application file for complete search history.

(56) References Cited

U.S. PATENT DOCUMENTS

| | | | |
|---|---|---|---|
| 5,473,149 A * | 12/1995 | Miwa et al. | 235/462.41 |
| 5,481,095 A * | 1/1996 | Mitsuda et al. | 235/454 |
| 6,622,915 B2 * | 9/2003 | Ishikawa | 235/454 |
| 8,196,839 B2 | 6/2012 | Wang | |
| 8,259,067 B2 | 9/2012 | Butterworth et al. | |
| 8,467,038 B2 | 6/2013 | Decoux et al. | |
| 8,508,646 B2 | 8/2013 | Katerberg | |
| 2002/0125411 A1 | 9/2002 | Christy | |
| 2011/0248086 A1 | 10/2011 | Droemer | |
| 2012/0026085 A1 | 2/2012 | McEldowney | |
| 2013/0027557 A1 | 1/2013 | Hirai et al. | |

* cited by examiner

*Primary Examiner* — Jamara Franklin

(57) ABSTRACT

A method of decoding a Direct Part Marking (DPM) indicia. The method includes: (1) generating a polarized illumination light; (2) illuminating the DPM indicia with the polarized illumination; (3) detecting light scattered from the DPM indicia through a linear polarizer with an imaging sensor while the DPM indicia is illuminated by the polarized illumination to capture an image of the DPM indicia though an imaging lens while preventing at least 80% of onetime scattered light caused by the target object from entering the imaging lens; and (4) processing the image of the DPM indicia to decode the DPM indicia.

20 Claims, 3 Drawing Sheets

DECODING DPM INDICIA WITH POLARIZED ILLUMINATION

FIELD OF THE DISCLOSURE

The present disclosure relates generally to imaging-based barcode scanners.

BACKGROUND

Various electro-optical systems have been developed for reading optical indicia, such as barcodes. A barcode is a coded pattern of graphical indicia comprised of a series of bars and spaces of varying widths. In a barcode, the bars and spaces have different light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more imaging sensors for reading and decoding barcodes are typically referred to as imaging-based barcode readers, imaging scanners, or imaging readers. A imaging sensor generally includes a plurality of photosensitive elements or pixels aligned in one or more arrays. Examples of imaging sensors include charged coupled devices (CCD) or complementary metal oxide semiconductor (CMOS) imaging chips.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
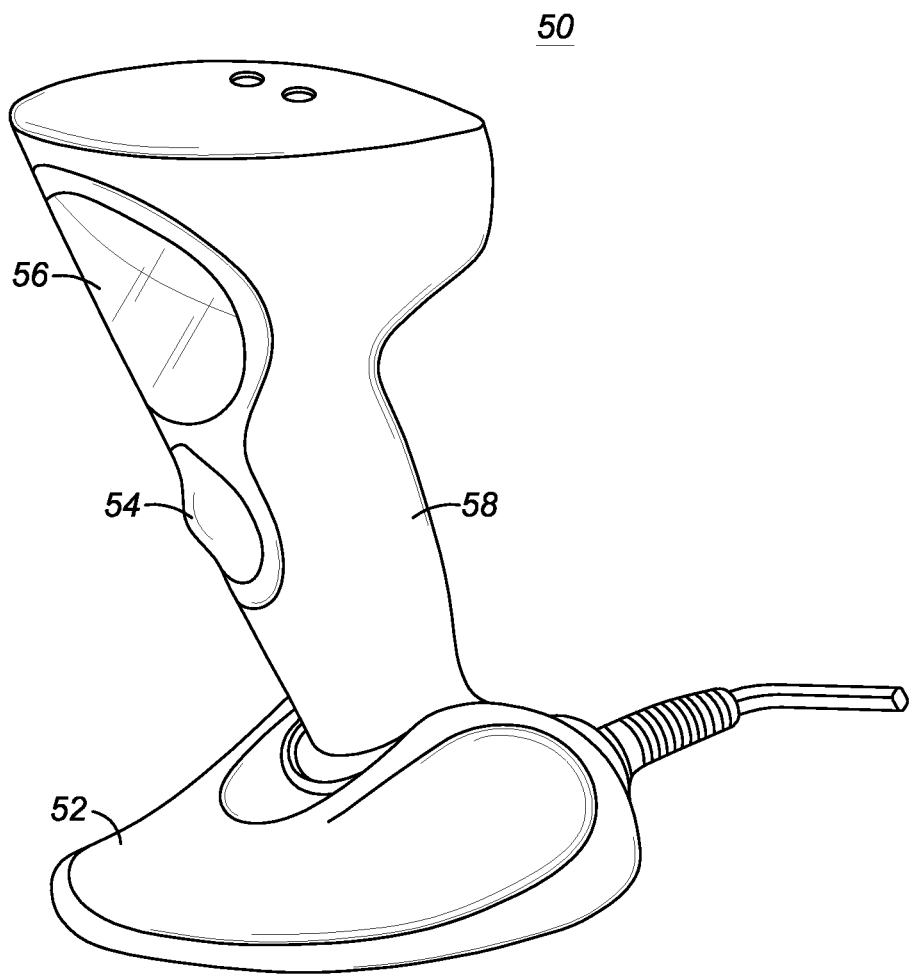
FIG. 1 shows an imaging scanner in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method of decoding a Direct Part Marking (DPM) indicia on a target object. The method includes the following: (1) generating a polarized illumination light by passing light from an illumination light source through a first linear polarizer; (2) illuminating the DPM indicia on the target object with the polarized illumination; (3) detecting light scattered from the DPM indicia through a second linear polarizer with photosensitive elements in an imaging sensor during a time period when the target object is illuminated by the polarized illumination to capture an image of the DPM indicia though an imaging lens arrangement while preventing at least 80% of onetime scattered light caused by the target object from entering the imaging lens arrangement; and (4) processing the image of the DPM indicia to decode the DPM indicia.

FIG. 1 shows an imaging scanner 50 in accordance with some embodiments. The imaging scanner 50 has a window 56 and a housing 58 with a handle. The imaging scanner 50 also has a base 52 for supporting itself on a countertop. The imaging scanner 50 can be used in a hands-free mode as a stationary workstation when it is placed on the countertop. The imaging scanner 50 can also be used in a handheld mode when it is picked up off the countertop and held in an operator's hand. In the hands-free mode, products can be slid, swiped past, or presented to the window 56. In the handheld mode, the imaging scanner 50 can be moved towards a barcode on a product, and a trigger 54 can be manually depressed to initiate imaging of the barcode. In some implementations, the base 52 can be omitted, and the housing 58 can also be in other shapes. In FIG. 1, a cable is also connected to the base 52. In other implementations, when the cable connected to the base 52 is omitted, the imaging scanner 50 can be powered by an on-board battery and it can communicate with a remote host by a wireless link.

Figure 2:
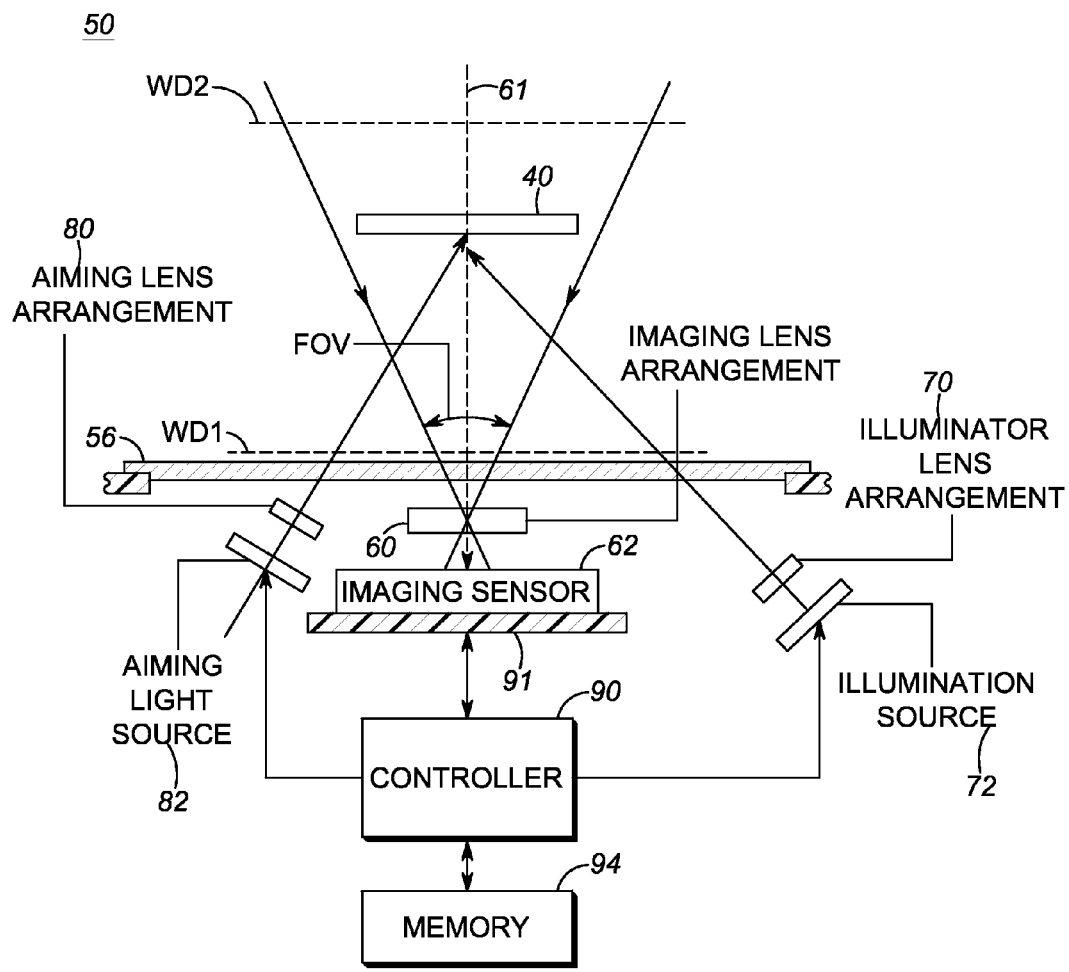
FIG. 2 is a schematic of an imaging scanner in accordance with some embodiments.

FIG. 2 is a schematic of an imaging scanner 50 in accordance with some embodiments. The imaging scanner 50 in FIG. 2 includes the following components: (1) an imaging sensor 62 positioned behind an imaging lens arrangement 60; (2) an illuminating lens arrangement 70 positioned in front of an illumination source 72; (3) an aiming lens arrangement 80 positioned in front of an aiming light source 82; and (4) a controller 90. In FIG. 2, the imaging lens arrangement 60, the illuminating lens arrangement 70, and the aiming lens arrangement 80 are positioned behind the window 56. The imaging sensor 62 is mounted on a printed circuit board 91 in the imaging scanner.

The imaging sensor 62 can be a CCD or a CMOS imaging device. The imaging sensor 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The imaging sensor 62 is operative to detect light captured by an imaging lens arrangement 60 along an optical path or axis 61 through the window 56. Generally, the imaging sensor 62 and the imaging lens arrangement 60 are designed to operate together for capturing light scattered or reflected from a barcode 40 as pixel data over a two-dimensional field of view (FOV).

The barcode 40 generally can be located anywhere in a working range of distances between a close-in working distance (WD1) and a far-out working distance (WD2). In one specific implementation, WD1 is in a close proximity to the window 56, and WD2 is about a couple of feet from the window 56. In FIG. 2, the illuminating lens arrangement 70 and the illumination source 72 are designed to operate together for generating an illuminating light towards the barcode 40 during an illumination time period. The illumination source 72 can include one or more light emitting diodes (LED). The illumination source 72 can also include a laser or other kind of light sources. The aiming lens arrangement 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser, LED, or other kind of light sources.

In FIG. 2, the controller 90, such as a microprocessor, is operatively connected to the imaging sensor 62, the illumination source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the field of view (FOV) of the imaging scanner 50. In some implementations, the barcode 40 can be decoded by digitally processing a captured image of the barcode with a microprocessor.

In operation, in accordance with some embodiments, the controller 90 sends a command signal to energize the illumination source 72 for a predetermined illumination time period. The controller 90 then exposes the imaging sensor 62 to capture an image of the barcode 40. The captured image of the barcode 40 is transferred to the controller 90 as pixel data. Such pixel data is digitally processed by the decoder in the controller 90 to decode the barcode. The information obtained from decoding the barcode 40 is then stored in the memory 94 or sent to other devices for further processing.

The imaging scanners are often used in applications involving Direct Part Marking (DPM). DPM refers to making permanent, machine readable marks in a variety of physical substrates. An important class of substrates is shiny (mirrored or mirror-like) surfaces, especially on metals, because these are notorious difficult to read with a scanner. To make DPM on shiny surfaces easier to read, some of the scanners are created with a large featureless and diffusive surface facing the front, and illuminated evenly with light, so that the part bearing the DPM can reflect a part of this surface back to the imager in the scanner which can in turn image it with some contrast. The extent of this diffusive surface is what makes the scanner operate with ease; the larger the extent, the easier it is to aim the scanner. It is for this reason these DPM scanners are rather large, especially in the front. It is desirable to reduce the size of DPM scanners and desirable to reduce the size of DPM scan-engines.

Figure 3:
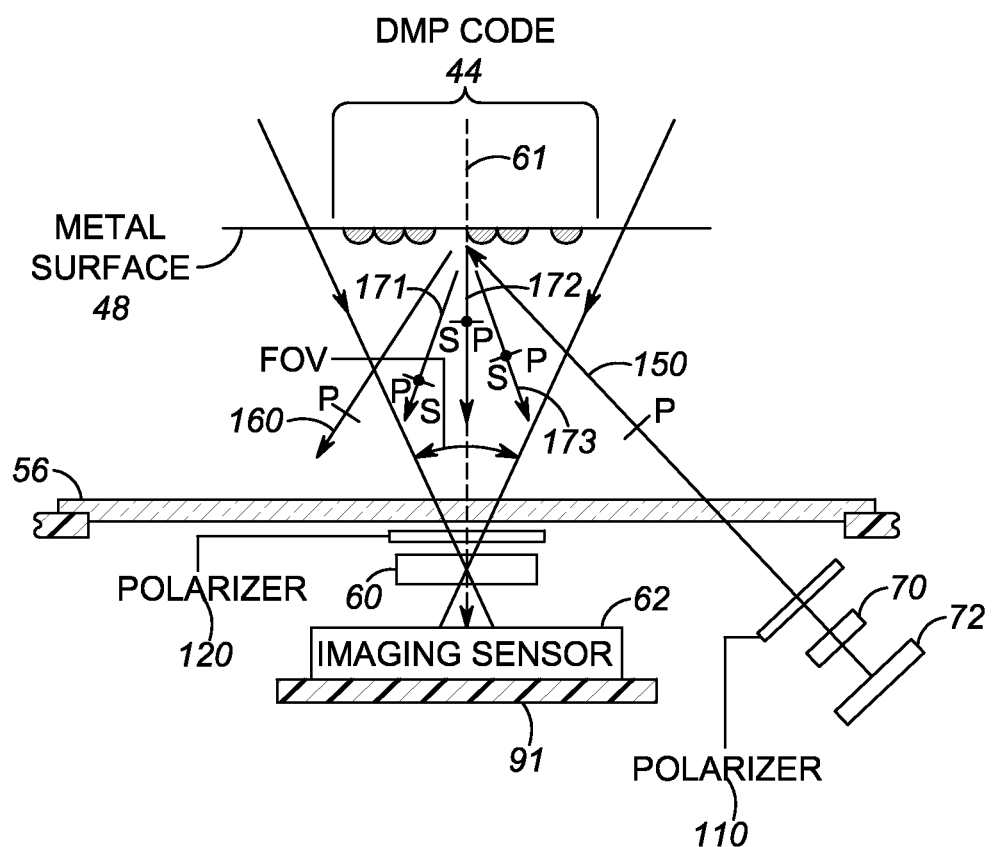
FIG. 3 is a schematic of an imaging scanner 50 that is capable to decode the DPM indicia in accordance with some embodiments.

FIG. 3 is a schematic of an imaging scanner 50 that is capable to decode the DPM indicia in accordance with some embodiments. As shown in FIG. 3, the DPM indicia to be decoded can be a DPM code 44 formed on a mental surface 48. The imaging scanner 50 includes an imaging lens arrangement 60 having an optical axis 61, a first linear polarizer 110, and an illumination light source 72 configured to generate a polarized illumination light 150 by passing light from the illumination light source through the first linear polarizer 110. In the embodiment as shown in FIG. 3, the angular distribution of the polarized illumination light 150 are designed in such a way to prevent at least 80% of the polarized illumination light 150 from entering the imaging lens arrangement 60 even if the DPM code 44 and the mental surface 48 are illuminated with almost all of the polarized illumination light projected out of the imaging scanner under the condition that the mental surface 48 is perpendicular the optical axis 61 of the imaging lens arrangement 60. Under similar condition and in other implementations, at least 90% of the polarized illumination light 150 can be prevented from entering the imaging lens arrangement 60. Under similar condition and in still other implementations, at least 95% of the polarized illumination light 150 can be prevented from entering the imaging lens arrangement 60.

The imaging scanner also includes a second linear polarizer 120, an imaging sensor 62 having photosensitive elements configured to detect light (e.g., 171, 172, 173, . . . ) scattered from the DPM indicia 44 through the second linear polarizer 120 during a time period when the target object is illuminated by the polarized illumination 150 to capture an image of the DPM indicia 44 though the imaging lens arrangement 60. The imaging scanner often has a controller that is operative for controlling both the illumination light source 72 and the imaging sensor 62, and is operative for processing the captured image of the DPM indicia to decode the DPM indicia 44.

In the implementation as shown in FIG. 3, the first linear polarizer 110 is configured for generating the polarized illumination light 150 as p-wave illumination light; additionally, the second linear polarizer 120 is configured to cause light 172 scattered from the DPM indicia 44 to pass through the second linear polarizer 120 as s-wave light. In other implementations, the polarized illumination light can have polarization other than p-wave, and the light passing through the second linear polarizer can have polarization other than s-wave. In general, the first linear polarizer can be configured for blocking light with polarization perpendicular to a first polarization direction, and the second linear polarizer can be configured for blocking light with polarization perpendicular to a second polarization direction. The first polarization direction and the second polarization direction can be substantially perpendicular to each other; for example, the angle between the first polarization direction and the second polarization direction can be within 20 degrees from 90 degree angle.

In the implementation as shown in FIG. 3, the imaging lens arrangement 60 is positioned between the second linear polarizer 120 and the imaging sensor 62. In other implementations, the second linear polarizer 120 can be positioned between the imaging lens arrangement 60 and the imaging sensor 62. In still other implementations, the second linear polarizer 120 can be positioned between the optical components (e.g., lens, aperture, and filters) within the imaging lens arrangement 60.

In the embodiment as shown in FIG. 3, the p-wave illumination 150 are designed to illuminate of the DPM indicia 44 with an incident angle that is sufficiently large with respect to the optical axis 61 of the imaging lens arrangement 60 to prevent at least 80% of onetime scattered light 160 caused by the target object 48 from entering the imaging lens arrangement 60. The onetime scattered light 160 caused by the target object 48 can include light directly reflected by the target object 48 and light scattered only once by the surface of the DPM indicia 44. In other implementations, more than 90% of onetime scattered light 160 caused by the target object 48 can be prevented from entering the imaging lens arrangement 60. In still other implementations, more than 95% of onetime scattered light 160 caused by the target object 48 can be prevented from entering the imaging lens arrangement 60.

In FIG. 3, a significant portion of reflected (or weakly scattered) light on metal has the same polarization of incident light. But a strongly scattered light by barcodes can include near 50% of cross polarized light (S-polarized). P-polarized light is filtered out by a polarizer 120 before imaging lens 60. So at the imaging sensor 62, the P-polarized specular light is significantly reduced. With this method, the incident light can be close to metal surface and a traditional diffuser in DPM barcode illumination design can be avoided.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of decoding a Direct Part Marking (DPM) indicia on a target object comprising:
   generating p-wave illumination light by passing light from an illumination light source through a first linear polarizer;
   illuminating the DPM indicia on the target object with the p-wave illumination;
   detecting s-wave light scattered from the DPM indicia with photosensitive elements in an imaging sensor during a time period when the target object is illuminated by the p-wave illumination to capture an image of the DPM indicia through an imaging lens arrangement while preventing at least 80% of onetime scattered light caused by the target object from entering the imaging lens arrangement; and
   processing the image of the DPM indicia to decode the DPM indicia.

2. The method of claim 1, wherein said detecting s-wave light scattered from the DPM indicia comprises:
   causing light scattered from the DPM indicia to pass first through a second linear polarizer.

3. The method of claim 1, wherein said detecting s-wave light scattered from the DPM indicia comprises:
   causing light scattered from the DPM indicia to pass first through a second linear polarizer and then through the imaging lens arrangement.

4. The method of claim 1, wherein said detecting s-wave light scattered from the DPM indicia comprises:
   causing light scattered from the DPM indicia to pass first through the imaging lens arrangement and then through a second linear polarize.

5. The method of claim 1, wherein said preventing comprises:
   preventing at least 90% of onetime scattered light caused by the target object from entering the imaging lens arrangement.

6. The method of claim 1, wherein said preventing comprises:
   preventing at least 95% of onetime scattered light caused by the target object from entering the imaging lens arrangement.

7. A method of decoding a Direct Part Marking (DPM) indicia on a target object comprising:
   generating a polarized illumination light by passing light from an illumination light source through a first linear polarizer;
   illuminating the DPM indicia on the target object with the polarized illumination;
   detecting light scattered from the DPM indicia through a second linear polarizer with photosensitive elements in an imaging sensor during a time period when the target object is illuminated by the polarized illumination to capture an image of the DPM indicia through an imaging lens arrangement while preventing at least 80% of onetime scattered light caused by the target object from entering the imaging lens arrangement; and
   processing the image of the DPM indicia to decode the DPM indicia.

8. The method of claim 7, wherein the first linear polarizer is configured for blocking light with polarization perpendicular to a first polarization direction, and the second linear polarizer is configured for blocking light with polarization perpendicular to a second polarization direction, and wherein the first polarization direction and the second polarization direction are substantially perpendicular to each other such that the angle between the first polarization direction and the second polarization direction are within 20 degrees from 90 degree angle.

9. The method of claim 7, wherein said detecting light scattered from the DPM indicia comprises:
   causing light scattered from the DPM indicia to pass first through the second linear polarizer.

10. The method of claim 7, wherein said detecting light scattered from the DPM indicia comprises:
    causing light scattered from the DPM indicia to pass first through the second linear polarizer and then through the imaging lens arrangement.

11. The method of claim 7, wherein said detecting light scattered from the DPM indicia comprises:
    causing light scattered from the DPM indicia to pass first through the imaging lens arrangement and then through the second linear polarizer.

12. The method of claim 7, wherein said preventing comprises:
    preventing at least 90% of onetime scattered light caused by the target object from entering the imaging lens arrangement.

13. The method of claim 7, wherein said preventing comprises:
    preventing at least 95% of onetime scattered light caused by the target object from entering the imaging lens arrangement.

14. A handheld barcode scanner for decoding a Direct Part Marking (DPM) indicia on a target object comprising:
    an imaging lens arrangement having an optical axis;
    a first linear polarizer;
    an illumination light source configured to generate polarized illumination light by passing light from the illumination light source through the first linear polarizer while preventing at least 80% of the polarized illumination light from entering the imaging lens arrangement when a fully reflective surface perpendicular the optical axis of the imaging lens arrangement is illuminated with more than 90% of the polarized illumination light projected out of the handheld barcode scanner;
    a second linear polarizer;
    an imaging sensor having photosensitive elements configured to detect light scattered from the DPM indicia through the second linear polarizer during a time period when the target object is illuminated by the polarized illumination to capture an image of the DPM indicia through the imaging lens arrangement;
    a controller operative for controlling both the illumination light source and the imaging sensor, and for processing the image of the DPM indicia to decode the DPM indicia.

15. The apparatus of claim 14, wherein the first linear polarizer is configured for blocking light with polarization perpendicular to a first polarization direction, and the second linear polarizer is configured for blocking light with polarization perpendicular to a second polarization direction.

16. The apparatus of claim 15, wherein the first polarization direction and the second polarization direction are substantially perpendicular to each other such that the angle between the first polarization direction and the second polarization direction are within 20 degrees from 90 degree angle.

17. The apparatus of claim 14, wherein the first linear polarizer is configured for generating the polarized illumination light as p-wave illumination light.

18. The apparatus of claim 17, wherein the second linear polarizer is configured to cause light scattered from the DPM indicia to pass through the second linear polarizer as s-wave light.

19. The apparatus of claim 14, wherein the imaging lens arrangement is positioned between the second linear polarizer and the imaging sensor.

20. The apparatus of claim 14, wherein the second linear polarizer is positioned between the imaging lens arrangement and the imaging sensor.

* * * * *